(12) United States Patent
Mitsui et al.

(10) Patent No.: US 10,341,922 B2
(45) Date of Patent: Jul. 2, 2019

(54) RADIO BASE STATION AND RADIO TERMINAL

(71) Applicant: KYOCERA CORPORATION, Kyoto (JP)

(72) Inventors: Katsuhiro Mitsui, Kawasaki (JP); Masato Fujishiro, Yokohama (JP); Kugo Morita, Yokohama (JP); Susumu Kashiwase, Machida (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 57 days.

(21) Appl. No.: 15/511,652

(22) PCT Filed: Sep. 24, 2015

(86) PCT No.: PCT/JP2015/076891
§ 371 (c)(1),
(2) Date: Mar. 16, 2017

(87) PCT Pub. No.: WO2016/047672
PCT Pub. Date: Mar. 31, 2016

(65) Prior Publication Data
US 2017/0303179 A1    Oct. 19, 2017

Related U.S. Application Data

(60) Provisional application No. 62/056,061, filed on Sep. 26, 2014.

(51) Int. Cl.
*H04W 36/24* (2009.01)
*H04W 36/00* (2009.01)
(Continued)

(52) U.S. Cl.
CPC ... *H04W 36/245* (2013.01); *H04W 36/00837* (2018.08); *H04W 36/14* (2013.01);
(Continued)

(58) Field of Classification Search
None
See application file for complete search history.

(56) References Cited

U.S. PATENT DOCUMENTS

| 2010/0173626 | A1 | 7/2010 | Catovic et al. |
| 2012/0202557 | A1 | 8/2012 | Olofsson et al. |

(Continued)

FOREIGN PATENT DOCUMENTS

| JP | 2012-514949 | 6/2012 |
| JP | 2013-535904 A | 9/2013 |

OTHER PUBLICATIONS

International Search Report issued in PCT/JP2015/076891; dated Oct. 20, 2015.
(Continued)

Primary Examiner — Mohamed A Kamara
Assistant Examiner — Saad Khawar
(74) Attorney, Agent, or Firm — Studebaker & Brackett PC

(57) ABSTRACT

A radio base station according to an embodiment constitutes a mobile communication network. The radio base station comprises: a controller configured to measure a stay time for which a radio terminal has stayed on a wireless LAN. The stay time is a period from when a first process through which the radio terminal switches a waiting destination or a connection destination from the mobile communication network to the wireless LAN is performed to when a second process through which the radio terminal switches the waiting destination or the connection destination from the wireless LAN to the mobile communication network is performed.

4 Claims, 10 Drawing Sheets

(51) Int. Cl.
*H04W 36/22* (2009.01)
*H04W 36/14* (2009.01)
*H04W 36/38* (2009.01)
H04W 88/06 (2009.01)
H04W 88/08 (2009.01)
H04W 84/12 (2009.01)

(52) U.S. Cl.
CPC .......... *H04W 36/22* (2013.01); *H04W 36/38* (2013.01); *H04W 84/12* (2013.01); *H04W 88/06* (2013.01); *H04W 88/08* (2013.01)

(56) References Cited

U.S. PATENT DOCUMENTS

2014/0200005 A1\* 7/2014 Wegmann .......... H04W 36/245
455/436
2017/0214592 A1\* 7/2017 Wigard ................ H04W 48/18

OTHER PUBLICATIONS

Written Opinion issued in PCT/JP2015/076891; dated Oct. 20, 2015.
3rd Generation Partnership Project; Technical Specification Group Radio Access Network; Evolved Universal Terrestrial Radio Access (E-UTRA); User Equipment (UE) procedures in idle mode; 3GPP TS 36.304 V12.1.0; Jun. 2014; pp. 1-35; Release 12; 3GPP Organizational Partners.

\* cited by examiner

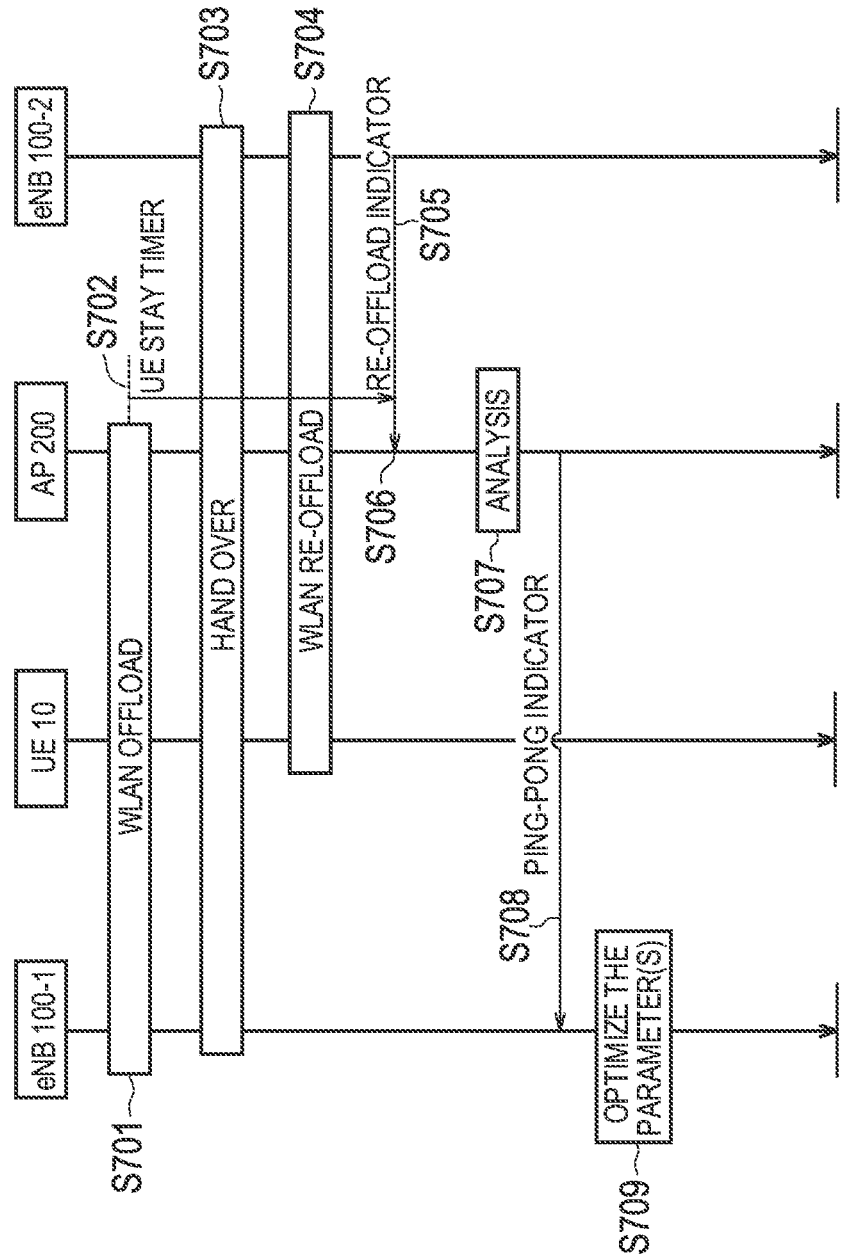

RADIO BASE STATION AND RADIO TERMINAL

TECHNICAL FIELD

The present application relates to a radio base station and a radio terminal, which are used in a system in which a switching process through which a waiting destination or a connection destination is switched between the coverage areas of a mobile communication network and a wireless LAN is performed.

BACKGROUND ART

In the art, a switching process (network selection and traffic steering) in which a waiting destination or a connection destination is switched between the wireless LAN and the mobile communication network when at least a part of a coverage area of a wireless LAN and a coverage area of the mobile communication network represented by LTE (Long Term Evolution) overlap each other is proposed. Specifically, the switching process is performed depending on whether first information of a mobile communication network side and second information of a wireless LAN side satisfy a first condition and a second condition, respectively.

Examples of the first information of the mobile communication network side include: a measurement result (RSRPmeas) of the level of a received signal (reference signal received power [RSRP]); and a measurement result (RSRQmeas) of the quality of a received signal (reference signal received quality [RSRQ]). Examples of the second information of the wireless LAN side include: a channel utilization value of the wireless LAN; a backhaul value of the wireless LAN; and a signal strength of a received signal (received signal strength indicator [RSSI]).

A radio base station provided in the mobile communication network informs a radio terminal of determination parameters to determine whether a switching process through which a waiting destination or a connection destination is switched between the mobile communication network and the wireless LAN is performed. There are a dedicated parameter of which the radio terminal dedicatedly informed and a broadcast parameter broadcasted to the radio terminal, as the determine parameters.

NON-PATENT DOCUMENT

[Non-Patent Document 1] TS36.304 V12.1.0

SUMMARY OF THE INVENTION

A radio base station according to an embodiment constitutes a mobile communication network. The radio base station comprises: a controller configured to measure a stay time for which a radio terminal has stayed on a wireless LAN. The stay time is a period from when a first process through which the radio terminal switches a waiting destination or a connection destination from the mobile communication network to the wireless LAN is performed to when a second process through which the radio terminal switches the waiting destination or the connection destination from the wireless LAN to the mobile communication network is performed.

BRIEF DESCRIPTION OF THE DRAWINGS

FIG. 10 is a sequence diagram for illustrating operation C-3 according to the embodiment.

DESCRIPTION OF THE EMBODIMENT

Summary of Embodiment

Figure 1:
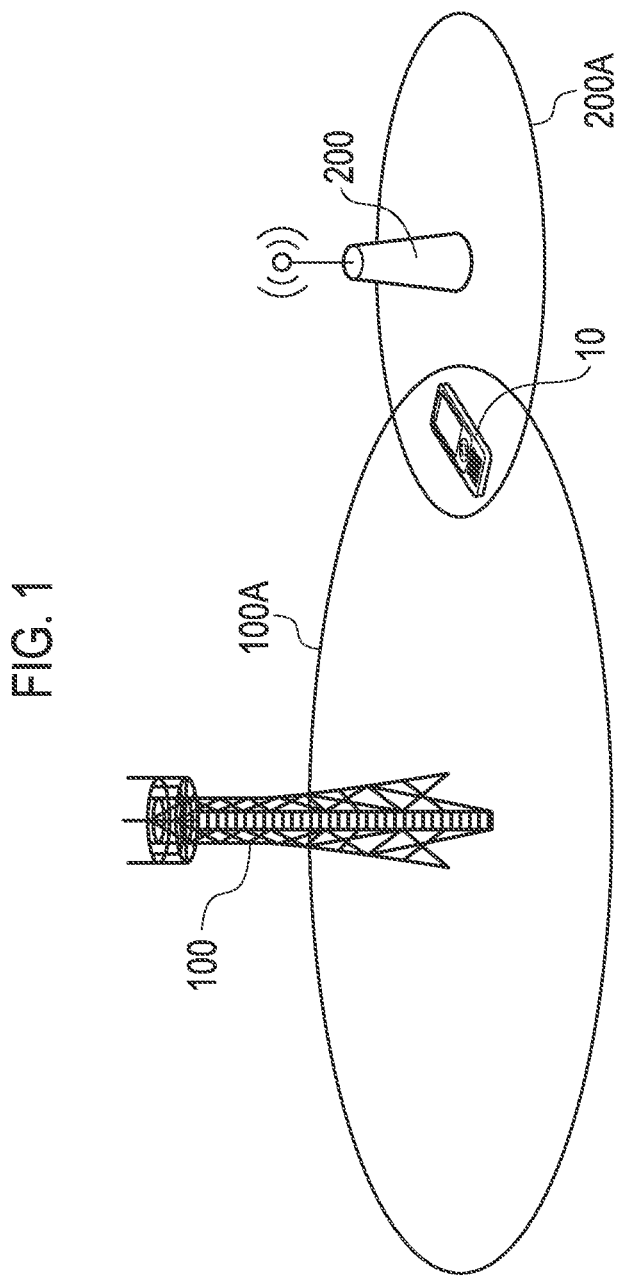
FIG. 1 is a diagram illustrating a communication system 1 according to an embodiment.

Conventional technology is that a phenomenon (hereinafter, a ping-pong phenomenon) may be occurred, the ping-pong phenomenon being a phenomenon in which a switching process (an offload process) in which the radio terminal switches its waiting destination or its connection destination from the mobile communication network to the wireless LAN and a switching process (a re-offload process) in which the same radio terminal switches the waiting destination or the connection destination from the wireless LAN to the mobile communication network are repeated.

To reduce an occurrence of the above ping-pong phenomenon, the radio base station preferably optimizes the determination parameters. Existing structure, however, fail to optimize the determination parameters appropriately, because information obtained is not enough for the optimization.

Therefore, the present application addresses disadvantages as described above with an object of providing a radio base station that is capable of acquiring information for optimization of determination parameters and a radio terminal that enables a radio base station to acquire that information.

A radio base station according to an embodiment constitutes a mobile communication network. The radio base station comprises: a controller configured to measure a stay time for which a radio terminal has stayed on a wireless LAN. The stay time is a period from when a first process through which the radio terminal switches a waiting destination or a connection destination from the mobile communication network to the wireless LAN is performed to when a second process through which the radio terminal switches the waiting destination or the connection destination from the wireless LAN to the mobile communication network is performed.

In the embodiment, the first process is a process through which the radio terminal switches the waiting destination or the connection destination from the own radio base station to the wireless LAN. The second process is a process through which the radio terminal switches the waiting destination or the connection destination from the wireless LAN to the own radio base station.

In the embodiment, the first process is a process through which the radio terminal switches the waiting destination or the connection destination from the own radio base station to the wireless LAN. The second process is a process through which the radio terminal switches the waiting destination or the connection destination from the wireless LAN to a different radio base station from the own radio base station.

In the embodiment, the controller detects that the radio terminal has performed the second process by receiving information from the different radio base station, the information indicating that the radio terminal has performed the second process.

In the embodiment, the controller detects that the radio terminal has performed the second process by receiving information from an entity configured to constitute the wireless LAN, the information indicating that the radio terminal has performed the second process.

In the embodiment, the controller determines a parameter on a basis of the stay time. The parameter is a parameter to be used by the radio terminal to determine whether to switch the waiting destination or the connection destination from the mobile communication network to the wireless LAN.

A radio terminal according an embodiment comprises: a controller configured to measure a stay time for having stayed on a wireless LAN; and a transmitter configured to transmit a message based on a measurement result of the stay time to a radio base station configured to constitute a mobile communication network. The stay time is a period from when a first process through which the radio terminal switches a waiting destination or a connection destination from the mobile communication network to the wireless LAN is performed to when a second process through which the radio terminal switches the waiting destination or the connection destination from the wireless LAN to the mobile communication network is performed.

In the embodiment, the message is a message indicating that a period from when the first process is performed to when the second process is performed is within a predetermined period.

In the embodiment, the message is a message indicating a value of the stay time.

In the embodiment, the message is information indicating that the radio terminal has performed the second process after performing the first process and that a predetermined phenomenon has occurred.

A radio base station according to an embodiment comprises: a receiver configured to receive a message based on a measurement result of a stay time for which a radio terminal has stayed on a wireless LAN, from the radio terminal that has been connected to the wireless LAN or an entity configured to constitute the wireless LAN. The stay time is a period from when a first process through which the radio terminal switches a waiting destination or the connection destination from a mobile communication network to the wireless LAN is performed to when a second process through which the radio terminal switches the waiting destination or the connection destination from the wireless LAN to the mobile communication network is performed.

In the embodiment, the message is a message indicating that a period from when the radio terminal performs the first process to when the radio terminal performs the second process is within a certain period.

In the embodiment, the message is a message indicating the stay time.

In the embodiment, the message is information indicating that the radio terminal has performed the second process after performing the first process and that a predetermined phenomenon has occurred.

A radio base station is a radio base station configured to constitute a mobile communication network. The radio base station comprises: a controller configured to decide a parameter to be used for that a radio terminal determines whether to switch a waiting destination or a connection destination between a mobile communication network and a wireless LAN when detecting that the radio terminal switches the waiting destination or the connection destination from the mobile communication network to the wireless LAN and then switches the waiting destination or the connection destination from the wireless LAN to the mobile communication network and that a predetermined phenomenon has occurred.

The radio base station further comprises: a receiver configured to receive information indicating that the predetermined phenomenon has occurred, from the radio terminal or an entity configured to constitute the wireless LAN. The controller is configured to detect that the predetermined phenomenon has occurred by reception of the information indicating that the predetermined phenomenon has occurred.

In the embodiment, the predetermined phenomenon is a phenomenon satisfying predetermined conditions. The predetermined conditions include a condition in which an elapsed period for which the radio terminal switches the waiting destination or the connection destination from the mobile communication network to the wireless LAN and then switches the waiting destination or the connection destination from the wireless LAN to the mobile communication network is within a predetermined period.

FIRST EMBODIMENT (Communication System)

A communication system according to a first embodiment will be described below. FIG. 1 is a diagram illustrating a communication system 1 according to the first embodiment.

As illustrated in FIG. 1, the communication system 1 includes a radio base station 100, an access point 200. The communication system 1 also includes a radio terminal 10 configured to be capable of connection with the radio base station 100 or the access point 200.

The radio terminal 10 may be implemented using a portable phone, a tablet, or some other terminal. The radio terminal 10 has a function of conducting radio communication with both the radio base station 100 and the access point 200.

The radio base station 100 has a first coverage area 100A and provides a mobile communication service conforming to LTE (Long Term Evolution), for example, within the first coverage area 100A. The radio base station 100 is included in E-UTRAN (Evolved Universal Terrestrial Radio Access Network) of LTE. The radio base station 100 acts as a network apparatus and manages one or more cells constituting the first coverage area 100A. The radio base station 100 is an entity of the mobile communication network. The "cell" may be regarded as a geographic term or a function of conducting radio communication with the radio terminal 10.

The access point 200 has a second coverage area 200A and provides a wireless LAN service within the second coverage area 200A. The access point 200 is an entity of the wireless LAN. The second coverage area 200A at least overlaps the first coverage area 100A; however, the second coverage area 200A may be contained within the first coverage area 100A. In general, the second coverage area 200A is smaller than the first coverage area 100A.

(Application Scene)

A description will be given of a method by which a radio terminal in the first embodiment performs a switching process (e.g., network selection and traffic steering) through which its waiting destination or its connection destination is switched between a mobile communication network and a wireless LAN. The radio terminal 10 in a RRC connected state or RRC idle state performs the switching process in order to select one from the mobile communication network (cellular communication network) and the wireless LAN (WLAN communication network), as a network via which traffic data is to be transmitted or received. More specifically, the radio terminal 10 performs the switching process (e.g., network selection and traffic steering) if first information of a mobile communication network side and second information of a wireless LAN side continue to satisfy a first condition and a second condition, respectively, over a predetermined period.

The switching process in the first embodiment includes: a first process through which a radio terminal switches its waiting destination or its connection destination from a mobile communication network to a wireless LAN; and a second process through which the radio terminal switches the waiting destination or the connection destination from the wireless LAN to the mobile communication network.

Examples of the first information of the mobile communication network side include: a measurement result (RSRPmeas) of the level of a received signal (reference signal received power [RSRP]); and a measurement result (RSRQmeas) of the quality of a received signal (reference signal received quality [RSRQ]).

Examples of the second information of the wireless LAN include side: a channel utilization value of the wireless LAN (ChannelUtilizationWLAN); a backhaul value of the downstream link of the wireless LAN (BackhaulRateD1WLAN); a backhaul value of the upstream link of the wireless LAN (BackhaulRateU1WLAN); and a signal strength of a received signal (received signal strength indicator [RSSI]).

(Switching Process of Switching from Mobile Communication Network to Wireless LAN)

An exemplary first condition for causing the radio terminal to switch its waiting destination or its connection destination from the mobile communication network to the wireless LAN is satisfied when one of relationships (1a) and (1b) listed below is established. Alternatively, the first condition may be satisfied when both of the relationships (1a) and (1b) are satisfied.

$$\text{RSRPmeas} < \text{Thresh}_{ServingOffloadWLAN,LowP} \quad (1a)$$

$$\text{RSRQmeas} < \text{Thresh}_{ServingOffloadWLAN,LowQ} \quad (1b)$$

It is noted that "$\text{Thresh}_{ServingOffloadWLAN,LowP}$" and "$\text{Thresh}_{ServingOffloadWLAN,LowQ}$" may be thresholds provided by the radio base station 100 or preset thresholds.

An exemplary second condition for causing the radio terminal to switch its waiting destination or its connection destination from the mobile communication network to the wireless LAN is satisfied when all of relationships (1c) to (1f) listed below are established. Alternatively, the second condition may be satisfied when at least one of the relationships (1c) to (1f) is established.

$$\text{ChannelUtilizationWLAN} < \text{Thresh}_{ChUtilWLAN,Low} \quad (1c)$$

$$\text{BackhaulRateD1WLAN} > \text{Thresh}_{BackhRateDLWLAN,High} \quad (1d)$$

$$\text{BackhaulRateU1WLAN} > \text{Thresh}_{BackhRateULWLAN,High} \quad (1e)$$

$$\text{RSSI} > \text{Thresh}_{BEACONRSSI,High} \quad (1f)$$

It is noted that "$\text{Thresh}_{ChUtilWLAN,Low}$," "$\text{Thresh}_{BackhRateDLWLAN,High}$," "$\text{Thresh}_{BackhRateULWLAN,High}$," and "$\text{Thresh}_{BEACONRSSI,High}$" may be thresholds provided by the radio base station 100 or preset thresholds.

(Process for Switching from Wireless LAN to Mobile Communication Network)

An exemplary first condition for causing the radio terminal to switch its waiting destination or its connection destination from the wireless LAN to the mobile communication network is satisfied when both relationships (2a) and (2b) listed below are established. Alternatively, the first condition may be satisfied when one of the relationships (2a) and (2b) is established.

$$\text{RSRPmeas} > \text{Thresh}_{ServingOffloadWLAN,HighP} \quad (2a)$$

$$\text{RSRQmeas} > \text{Thresh}_{ServingOffloadWLAN,HighQ} \quad (2b)$$

It is noted that "$\text{Thresh}_{ServingOffloadWLAN,HighP}$" and "$\text{Thresh}_{ServingOffloadWLAN,HighQ}$" may be thresholds provided by the radio base station 100 or preset thresholds.

An exemplary second condition for causing the radio terminal to switch its waiting destination or its connection destination from the wireless LAN to the mobile communication network is satisfied when one of conditions (2c) to (2f) listed below is established. Alternatively, the second condition may be satisfied when all of the conditions (2c) to (2f) are established.

$$\text{ChannelUtilizationWLAN} > \text{Thresh}_{ChUtilWLAN,High} \quad (2c)$$

$$\text{BackhaulRateD1WLAN} < \text{Thresh}_{BackhRateDLWLAN,Low} \quad (2d)$$

$$\text{BackhaulRateU1WLAN} < \text{Thresh}_{BackhRateULWLAN,Low} \quad (2e)$$

$$\text{RSSI} < \text{Thresh}_{BEACONRSSI,Low} \quad (2f)$$

It is noted that "$\text{Thresh}_{ChUtilWLAN,High}$," "$\text{Thresh}_{BackhRAteDLWLAN,Low}$," "$\text{Thresh}_{BackhRateULWLAN,Low}$," and "$\text{Thresh}_{BEACONRSSI,Low}$" may be thresholds provided by the radio base station 100 or preset thresholds.

It is noted that, if any of the above thresholds is not provided, the radio terminal 10 may skip a process of acquiring (in other words, receiving or measuring) the information related to this unprovided threshold.

In the first embodiment, the thresholds listed above are exemplary determination parameters (e.g., RAN assistance parameters) to be used by the radio terminal to determine whether to perform a switching process through which its waiting destination or its connection destination is switched between the mobile communication network and the wireless LAN. In other words, the determination parameters may be one or more selected from among "$\text{Thresh}_{ServingOffloadWLAN,LowP}$," "$\text{Thresh}_{ServingOffloadWLAN,LowQ}$," "$\text{Thresh}_{ChUtilWLAN,Low}$," "$\text{Thresh}_{BackhRateDLWLAN,High}$," "$\text{Thresh}_{BackhRateULWLAN,High}$," "$\text{Thresh}_{BEACONRSSI,High}$," "$\text{Thresh}_{ServingOffloadWLAN,HighP}$," "$\text{Thresh}_{ServingOffloadWLAN,HighQ}$," "$\text{Thresh}_{ChUtilWLAN,High}$," "$\text{Thresh}_{BackhRateDLWLAN,Low}$," "$\text{Thresh}_{BackhRateULWLAN,Low}$," and "$\text{Thresh}_{BEACONRSSI,Low}$."

A predetermined period ($\text{Tsteering}_{WLAN}$) over which the first or second condition continues to be satisfied may be used as one of the above determination parameters. In addition, when the radio terminal 10 performs the offload process through which its waiting destination or its connection destination is switched from the mobile communication network to the wireless LAN, a predetermined period (T350 timer value) over which the radio terminal 10 holds an dedicated parameter described below may be used as one of the determination parameters.

There are the dedicated parameter of which the radio base station 100 informs dedicatedly the radio terminal 10 and a broadcast parameter which the radio base station 100 broadcast to the radio terminals 10, as the determination parameters. The dedicated parameter may be contained in, for example RRC messages (e.g., RRC Connection Reconfigurations) transmitted from the base station 100 to the radio terminal 10. The broadcast parameter may be contained in SIB (e.g., WLAN-OffloadConfig-r12) broadcasted from the base station 100. It is noted that, if receiving both a broadcast parameter and a dedicated parameter, the radio terminal 10 may give a higher priority to the dedicated parameter than the broadcast parameter.

(Radio Terminal)

Figure 2:
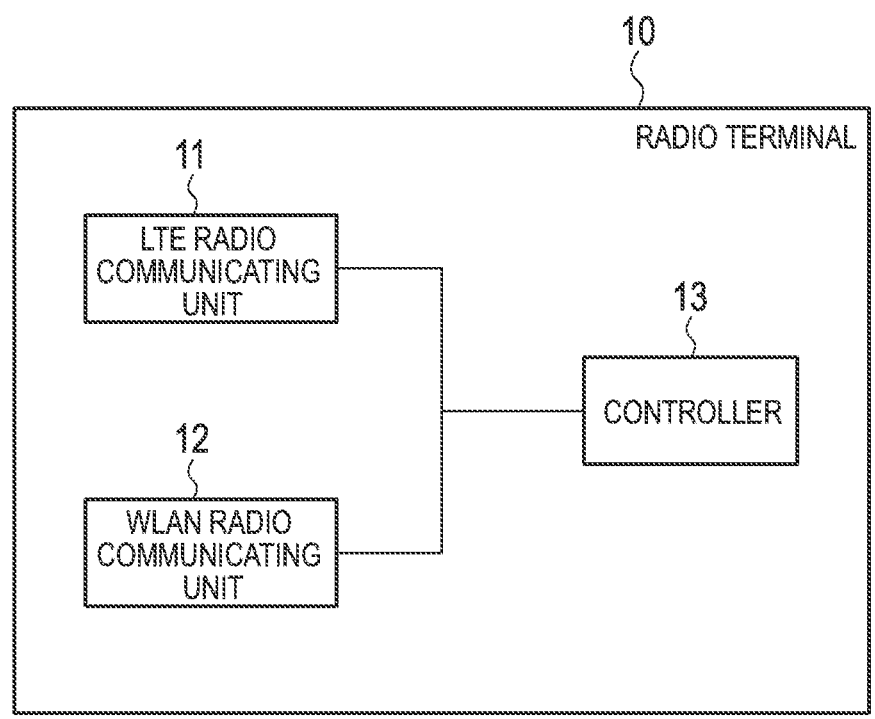
FIG. 2 is a block diagram illustrating the radio terminal 10 according to the embodiment.

The radio terminal according to the first embodiment will be described below. FIG. 2 is a block diagram illustrating the radio terminal 10 according to the first embodiment.

As illustrated in FIG. 2, the radio terminal 10 includes an LTE radio communicating unit 11 (a transceiver/a transmitter/a receiver), a WLAN radio communicating unit 12 (a transceiver/a transmitter/a receiver), and a controller 13.

The LTE radio communicating unit 11, which may be implemented using a radio transceiver, has a function of conducting radio communication with the radio base station 100. For example, the LTE radio communicating unit 11 periodically receives reference signals from the radio base station 100. Then, the LTE radio communicating unit 11 periodically measures the levels (RSRPs) and qualities (RSRQs) of the reference signals. Furthermore, the LTE radio communicating unit 11 receives dedicated parameters and broadcast parameters from the radio base station 100 as the determination parameters.

The WLAN radio communicating unit 12, which may be implemented using a radio transceiver, has a function of conducting radio communication with the access point 200. For example, the WLAN radio communicating unit 12 receives beacons or probe responses from the access point 200. Each beacon or probe response contains a BBS Load information element, from which a channel utilization value (ChannelUtilizationWLAN) of the wireless LAN can be acquired.

The WLAN radio communicating unit 12 receives responses (GAS responses) that the access point 200 transmits in response to requests (generic advertisement service [GAS] requests). The response (GAS Response) may contain a backhaul value (BackhaulRateD1WLAN) of the downstream link of the wireless LAN and a backhaul value (BackhaulRateU1WLAN) of the upstream link of the wireless LAN. This inquiry procedure conforms to ANQP (Access Network Query Protocol) specified by Hotspot 2.0 of WFA (Wi-Fi Alliance).

The WLAN radio communicating unit 12 receives signals from the access point 200 and then measures the levels (RSSIs) of the received signals. The level (RSSI) of a received signal corresponds to the signal strength of a beacon or probe response.

The controller 13, which is implemented using a CPU (processor) and a memory, for example, controls the radio terminal 10. More specifically, the controller 13 controls the LTE radio communicating unit 11 and the WLAN radio communicating unit 12. In addition, if the first information of the side of the mobile communication network and the second information of the side of the wireless LAN continue to satisfy the first and second conditions, respectively, over the predetermined period, the controller 13 performs the switching process through which its waiting destination or its connection destination is switched between the mobile communication network and the wireless LAN.

In the first embodiment, after performing the offload process through which its waiting destination or its connection destination is switched from the mobile communication network to the wireless LAN and in turn a re-offload process through which the waiting destination or the connection destination is switched from the wireless LAN to the mobile communication network, the controller 13 discards the dedicated parameter.

Specifically, as a general rule, the controller 13 holds the dedicated parameter for the period (T350 timer value) over which the predetermined timer (T350 timer) remains active; this timer is started up by the radio terminal 10 when the radio terminal 10 transits to an idle state with the offload process. In other words, the controller 13 discards the dedicated parameter when the predetermined timer expires or stops.

(Radio Base Station)

Figure 3:
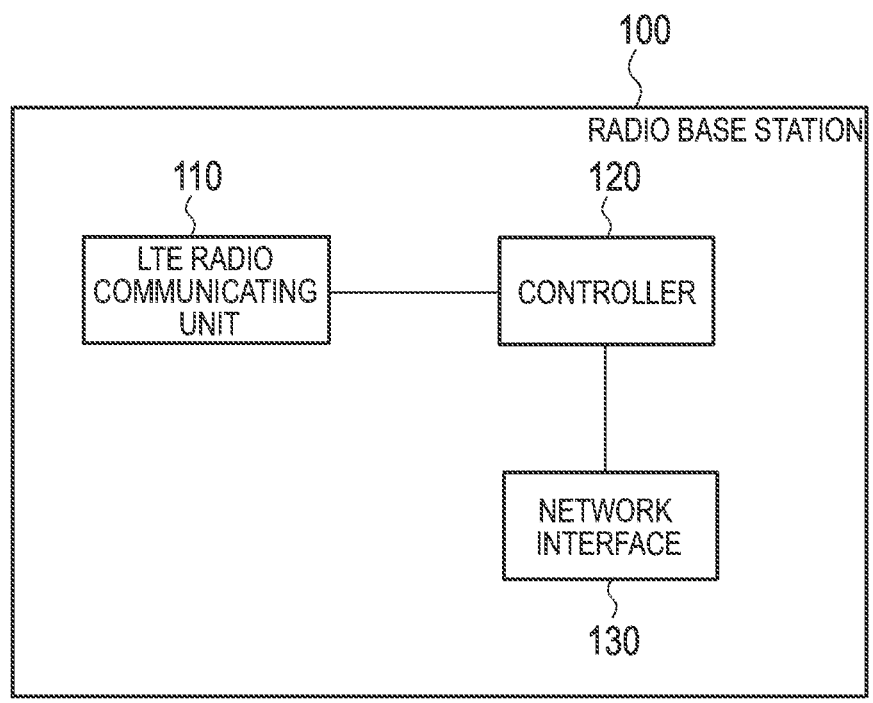
FIG. 3 is a block diagram illustrating the radio base station 100 according to the embodiment.

The radio base station according to the first embodiment will be described below. FIG. 3 is a block diagram illustrating the radio base station 100 according to the first embodiment.

As illustrated in FIG. 3, the radio base station 100 includes an LTE radio communicating unit 110 (a transceiver/a transmitter/a receiver), a controller 120, and a network interface 130.

The LTE radio communicating unit 110 has a function of conducting radio communication with the radio terminal 10. For example, the LTE radio communicating unit 110 periodically transmits the reference signals to the radio terminal 10. The LTE radio communicating unit 110, for example, is implemented using a radio transceiver. The LTE radio communicating unit 110 transmits the dedicated parameters and the broadcast parameters to the radio terminal 10 as determination parameters. As described above, the LTE radio communicating unit 110 informs the radio terminal 10 of the dedicated parameter through the RRC message (e.g., RRC connection reconfiguration) and broadcasts the broadcast parameters through SIB (e.g., WLAN-OffloadConfig-r12).

The controller 120, which is implemented using a CPU (processor) and a memory, for example, controls the radio base station 100. More specifically, the controller 120 controls the LTE radio communicating unit 110 and the network interface 130. The controller 120 may have a memory that functions as a storage unit. Alternatively, another memory that functions as the storage unit may be installed separately from the memory in the controller 120.

The network interface 130 is connected to a neighboring base station via an X2 interface and to MME/S-GW via an S1 interface. The network interface 130 is used for communications over the X2 interface and the S1 interface. The network interface 130 may be connected to the access point 200 via another predetermined interface and used to communicate with the access point 200.

(Determination Whether to Perform Switching Process)

A determination of a switching process as an example of will be described below as an example of a switching process from the mobile communication network to the wireless LAN.

First, a description will be given of a method of determining whether the first information continues to satisfy the first condition over the predetermined period (Tsteering$_{WLAN}$). The first information corresponds to the measurement result (RSRPmeas) of the level of a reference signal (RSRP) or the measurement result (RSRQmeas) of the quality of the reference signal (RSRQ). Reference signals are periodically received at short period, and thus RSRPmeas or RSRQmeas is measured at a relatively short period. Accordingly, RSRPmeas or RSRQmeas is successively acquired along a temporally axial direction.

Second, a description will be given of a method of determining whether the second information continues to satisfy the second condition over the predetermined period (Tsteering$_{WLAN}$). There is no agreement about a period for acquiring the second information. Accordingly, pieces of the second information (e.g., BackhaulRateD1WLAN or BackhaulRateU1WLAN) are discretely acquired along a temporally axial direction.

Operation According to Embodiment

Next, an operation according to the embodiment will be described. More specifically, a description will be given of an operation to acquire information for use in optimizing the determination parameters in order to reduce an occurrence of the ping-pong phenomenon.

Hereinafter, a description will be given of cases (A), (B), and (C) where a certain object measures a stay time for which the radio terminal 10 has stayed on the wireless LAN in order to determine whether the ping-pong phenomenon has occurred. In case (A), the object is assumed to be the radio base station (eNB) 100; in case (B), the radio terminal (UE) 10; and in case (C), the access point (AP) 200. Descriptions that are common among these cases will be omitted as appropriate.

(A) Radio Base Station 100

A description will be given regarding a case where the radio base station 100 has a UE stay timer that measures the stay time for which the radio terminal 10 has stayed on the wireless LAN.

Figure 4:
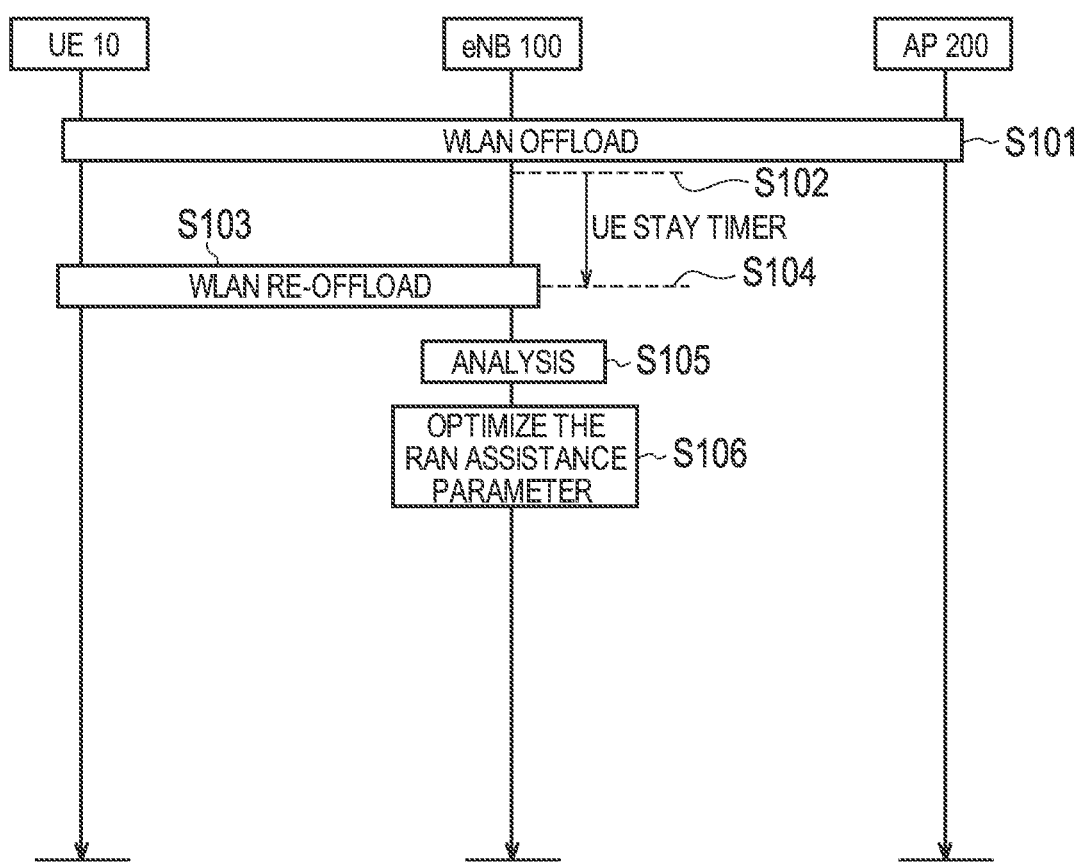
FIG. 4 is a sequence diagram for illustrating operation A-1 according to the embodiment.

First, with reference to FIG. 4, a description will be given regarding a case where the radio terminal 10 performs the offload process from the radio base station 100 to the wireless LAN and in turn the re-offload process from the wireless LAN to the same radio base station 100. FIG. 4 is a sequence diagram for illustrating operation A-1 according to the embodiment.

Referring to FIG. 4, at Step S101, the radio terminal 10 performs the offload process from the radio base station 100 to the access point 200.

At Step S102, the radio base station 100 starts to operate the UE stay timer by using the performing of the offload process as the trigger. When detecting the start or end of the offload process (completion of connecting to the access point 200), for example, the radio base station 100 may start to operate the UE stay timer. Alternatively, when detecting the performing of the offload process from a procedure through which the radio terminal 10 in a cell managed by the radio base station 100 itself transits to an idle state, the radio base station 100 may start to operate the UE stay timer. Thus, the radio base station 100 may start to operate the UE stay timer by using the release of the RRC-connection from the radio terminal 10 as the trigger.

Furthermore, a P-GW (packet data network gateway), which is a network node that controls relaying of user data to/from an external network, may determine whether the offload process (or re-offload process) has been performed, on the basis of the data flow to or from the radio terminal 10. The P-GW informs the radio base station 100 of information indicating the offload process via a network node which controls, for example the mobility of the radio terminal 10 and corresponds to a control station, such as an MME. In this case, the radio base station 100 may start to operate the UE stay timer by using, as the trigger, the reception of the information indicating the offload process.

At Step S103, the radio terminal 10 performs the re-offload process from the access point 200 to the radio base station 100.

At Step S104, the radio base station 100 stops the operation of the UE stay timer by using the performing of the re-offload process as the trigger. When detecting the start or end of the re-offload process, for example, the radio base station 100 may stop the operation of the UE stay timer. Alternatively, when detecting the performing of the re-offload process from a procedure through which the radio terminal 10 in a cell managed by the radio base station 100 itself transits to a connected state, the radio base station 100 may stop the operation of the UE stay timer. Thus, the radio base station 100 may stop the operation of the UE stay timer by using, as the trigger, the establishment of the RRC connection to the radio terminal 10. Alternatively, the radio base station 100 may stop the operation of the UE stay timer by using, as the trigger, the reception of an RRC connection request from the radio terminal 10 or the reception of information indicating the re-offload process from the P-GW.

At Step S105, the radio base station 100 determines (analyzes) whether the ping-pong phenomenon has occurred, on the basis of the measurement of the stay time. If the stay time is shorter than a threshold indicating the occurrence of the ping-pong phenomenon, the radio base station 100 determines that the ping-pong phenomenon has occurred. Thus, when the elapsed period (the stay time) from performing the offload process is performed to performing the re- offload process is within a predetermined period, the radio base station determines that the ping-pong phenomenon has occurred.

At Step S106, if determining that the ping-pong phenomenon has occurred, the radio base station 100 optimizes the determination parameters. For example the radio base station 100 may decrease the threshold of the first information regarding the mobile communication network. Alternatively, the radio base station 100-1 may increase the threshold of the second information regarding the wireless LAN. In short, the radio base station 100 sets the determination parameters such that a possibility of performing the offload process to the wireless LAN is reduced.

Alternatively, the radio base station 100 may optimize a timer (Tsteering WLAN Timer) that indicates the predetermined period (Tsteering$_{WLAN}$). This timer is used to measure the minimum time (Tsteering$_{WLAN}$) for which the first information should continue to satisfy the first condition or for which the second information should continue to satisfy the second condition in order to perform the offload or re-offload process. For example the radio base station 100 may set the timer in such a way that the predetermined period (Tsteering$_{WLAN}$) increases.

Figure 5:
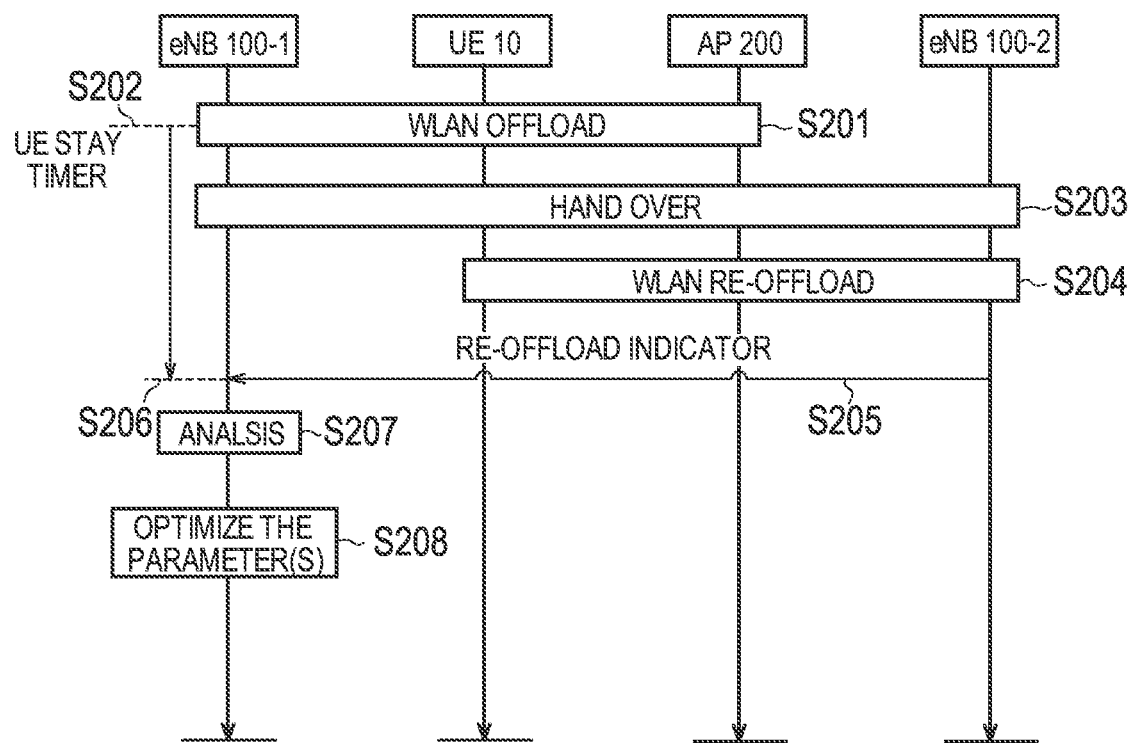
FIG. 5 is a sequence diagram for illustrating operation A-2 according to the embodiment.

Secondly, with reference to FIG. 5, a description will be given regarding a case where the radio terminal 10 performs an offload process from a radio base station 100-1 to the wireless LAN and in turn a re-offload process from the wireless LAN to a radio base station 100-2 that is different from the radio base station 100-1. FIG. 5 is a sequence diagram for illustrating operation A-2 according to the embodiment.

At Step S201, the radio terminal 10 performs the offload process from the radio base station 100-1 to the access point 200. In this case, the radio terminal 10 is in a connected state within a cell managed by the radio base station 100.

At Step S202, the radio base station 100-1 starts to operate the UE stay timer in response to the performing of the offload process.

At Step S203, the radio terminal 10 change the cell in which the radio terminal 10 exists from the cell managed by the radio base station 100-1 to a cell managed by the radio base station 100-2 by a handover procedure. It is noted that the state where the radio terminal 10 exists in a cell may be a waiting state (RRC idle state) for the cell managed by the radio base station 100-1 or a connected state (RRC connected state) of being connected to the cell managed by the radio base station 100-1.

It is noted that in the above handover procedure, the radio base station 100-1 may transmit information indicating that the radio terminal 10 has started to operate the UE stay timer to the radio base station 100-2.

At Step S204, the radio terminal 10 performs the re-offload process from the access point 200 to the radio base station 100-2.

At Step S205, the radio base station 100-2 transmits information (re-offload indicator) to the radio base station 100-1 that is the previous source base station for the radio terminal 10 by the performing of the re-offload process as the trigger. In this case, the re-offload indicator indicates that the radio terminal 10 has performed the re-offload process from the wireless LAN to the radio base station 100-1. For example the radio base station 100-2 may transmit the re-offload indicator by using, as the trigger, the reception of information from the P-GW which indicates that the re-offload process has been performed. In the above embodiment, the radio base station 100-2 does not necessarily have to transmit the re-offload indicator. Instead, the radio base station 100-2 may transmit any given information indicating that the radio terminal 10 has performed the re-offload process from the wireless LAN to the radio base station 100-1.

The re-offload indicator may contain one or more of the pieces of information listed below.

Message Type
eNB identifier (E-UTRAN CGI [Source cell/Target cell])
WLAN identifier (WLAN ID)
UE identifier (UE ID)

It is noted that the message type indicates that this message is the re-offload indicator.

The eNB identifier is an identifier (destination identifier) indicating a radio base station 100 that has been subjected to an offload process or an identifier (source identifier) indicating a radio base station 100 that has been subjected to a re-offload process.

The WLAN identifier is an identifier indicating the access point 200 that has been subjected to the re-offload process. The WLAN identifier may be one of a BSSID (basic service set identifier), an HESSID (homogenous extended service set identifier), and an SSID (service set identifier).

The UE identifier is an identifier indicating the radio terminal 10.

At Step S206, the radio base station 100-1 stops the operation of the UE stay timer in response to the reception of the re-offload indicator.

Steps S207 and S208 correspond to Steps S105 and S106 (see FIG. 4), respectively.

At Step S208, the radio base station 100 may optimize handover parameters (HO parameters), similar to the determination parameters; the handover parameters are used by the radio terminal 10 within the cell of the radio base station 100 itself to determine whether to perform a handover operation. More specifically, if determining that the occurrence of the ping-pong phenomenon is attributed to the handover procedure, the radio base station 100 changes the handover parameters so that the handover procedure starts before the offload process. For example, the radio base station 100 may decrease a waiting time (time to trigger [TTT]) during which the radio terminal 10 determines whether to transmit the measurement report to the radio base station 100. Alternatively, the radio base station 100 may increase cell-specific offset values (cell individual offsets [CIOs]) added to neighboring cells. Therefore, the handover procedure starts before the offload process, and it is thus possible to reduce the risk that the radio terminal 10 performs the offload process in accordance with the determination parameters from the radio base station 100 of a handover source and immediately following this, performs the re-offload process in accordance with the determination parameters from the radio base station 100 of a handover destination. In this way, an occurrence of the ping-pong phenomenon can be reduced.

It is noted that a radio base station, for example, determines that an occurrence of the ping-pong phenomenon is attributed to the handover procedure if receiving the re-offload indicator from a radio base station 100 of a handover destination and if determining that the ping-pong phenomenon has occurred.

(B) Radio Terminal 10

Next, a description will be given regarding a case where the radio terminal 10 has a UE stay timer.

Figure 6:
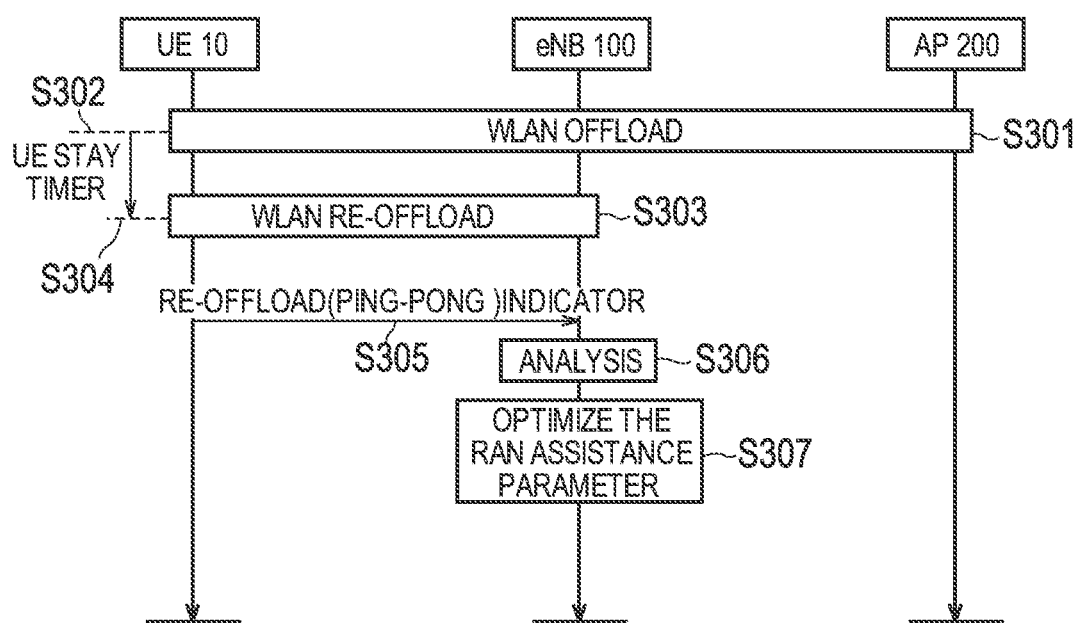
FIG. 6 is a sequence diagram for illustrating operation B-1 according to the embodiment.

First, with reference to FIG. 6, a description will be given regarding a case where the radio terminal 10 performs the offload process from the radio base station 100 to the wireless LAN and in turn the re-offload process from the wireless LAN to the same radio base station 100. FIG. 6 is a sequence diagram for illustrating operation B-1 according to the embodiment.

As illustrated in FIG. 6, at Step S301, the radio terminal 10 performs the offload process from the radio base station 100 to the access point 200.

At Step S302, the radio terminal 10 starts to operate the UE stay timer by using the performing of the offload process as the trigger. In other words, the radio terminal 10 starts to operate the UE stay timer in the same manner as the radio base station 100 does at Step S102. Alternatively, the radio terminal 10 may start to operate the UE stay timer by using the reception of information indicating the offload process as the trigger.

At Step S303, the radio terminal 10 performs the re-offload process from the access point 200 to the radio base station 100.

At Step S304, the radio terminal 10 stops the operation of the UE stay timer by using the performing of the re-offload process as the trigger. In other words, the radio terminal 10 stops the operation of the UE stay timer in the same manner as the radio base station 100 does at Step S104. Alternatively, the radio terminal 10 may stop the operation of the UE stay timer by using the reception of information indicating the re-offload process as the trigger.

At Step S305, the radio terminal 10 transmits a re-offload indicator and/or a ping-pong indicator to the radio base station 100; the re-offload indicator and the ping-pong indicator are messages indicating a measurement result from the UE stay timer, or a measurement result of the stay time.

The re-offload indicator is a message indicating that the radio terminal 10 has performed the re-offload process from the wireless LAN to the radio base station 100 and/or indicating a measurement of the stay time. The ping-pong indicator is a message indicating that a period from when the offload process is performed to when the re-offload process is performed is within a certain period. In this way, the radio terminal 10 can transmit the re-offload indicator after the UE stay timer stops its operation. On the other hand, the radio terminal 10 can transmit the ping-pong indicator only when the measurement of the stay time is less than the threshold indicating the occurrence of the ping-pong phenomenon. In other words, the ping-pong indicator indicates a result of determining that the ping-pong phenomenon has occurred. Alternatively, the ping-pong indicator may be any message indicating that the ping-pong phenomenon has occurred. Herein, for example, it can be said that the ping-pong phenomenon means a phenomenon in which a predetermined condition is satisfied and the radio terminal 10 switches its connection destination from the mobile communication network to the wireless LAN and in turn from the wireless LAN to the mobile communication network. An exemplary condition is that the measurement of the stay time for the wireless LAN is less than the threshold indicating the occurrence of the ping-pong phenomenon. Hereinafter, the ping-pong phenomenon may imply the above meaning.

Each of the re-offload indicator and the ping-pong indicator may contain the pieces of information listed below. It should be noted that the same description as in the re-offload indicator will be omitted below as appropriate.

Message Type
eNB identifier (E-UTRAN CGI [Source cell/Target cell])
WLAN identifier (WLAN ID)
UE identifier (UE ID)
WLAN stay time (WLANStayTimer)
offload traffic (OffloadTraffic)
re-offload cause (Re-offloadCause)
user preference (UserPreference)
UE measurement report (UE measurementReport)

It is noted that the above eNB identifier is the identifier of the radio base station 100 or a cell that has been subjected to the offload process and the re-offload process.

The WLAN stay time indicates a measurement result from the UE stay timer. More specifically, the WLAN stay time indicates a measurement of the stay time for which the radio terminal 10 has stayed on the wireless LAN.

The offload traffic indicates the data volume that the radio terminal 10 offloads via the wireless LAN.

The re-offload cause indicates the reason why the radio terminal 10 has performed the re-offloads. Alternatively, the re-offload cause may indicate the threshold contained in the determination parameter, such as a RAN assistance parameter, that has been used for the re-offload. Alternatively, the offload cause may indicate reasons for the thresholds (e.g., ChannelUtilizationWLAN, BackhaulRate, BackhaulRateU1WLAN, RSRP, and RSRQ), such as measurements thereof, contained in the determination parameters.

The user preference indicates that the re-offload process has been performed in accordance with a user's decision. For example, the user preference may be information indicating that a user has selected the wireless LAN through a manual operation. In other words, when an instruction of selecting the wireless LAN or some other similar instruction enters the controller in the radio terminal, the re-offload indicator and the ping-pong indicator may contain the user preference. Alternatively, for example the user preference may be flag information that indicates "ON" if the re-offload process has been performed in accordance with a user's decision and indicates "OFF" if the re-offload process has been performed independently of a user's decision.

The UE measurement report contains information that indicates the quality and/or strength of a signal received via the wireless LAN which has been measured while the radio terminal stays on the wireless LAN.

Steps S306 and S307 correspond to Steps S105 and S106, respectively.

If receiving the ping-pong indicator, the radio base station 100 may skip a process of determining whether the ping-pong phenomenon has occurred.

It is noted that the radio base station 100 can know the state of the second coverage area 200A of the access point 200, on the basis of the above pieces of information, especially the UE measurement report contained in the re-offload indicator and the ping-pong indicator. In addition, the radio base station 100 can determine whether the offload process has started at appropriate timing, on the basis of the above pieces of information, especially the UE measurement report contained in the re-offload indicator and the ping-pong indicator. For example if a signal received via the wireless LAN is weaker than an expectation at the start of the offload process, the radio base station 100 may determine that the offload process has started at earlier timing.

The analysis described above enables the radio base station 100 to optimize the determination parameters and the Tsteering WLAN Timer.

It is noted that, to optimize the determination parameters and the Tsteering WLAN Timer more appropriately, the radio base station 100 may set or update the determination parameters and the Tsteering WLAN Timer on the basis of the user preference unless the offload process and the re-offload process are performed in accordance with a user's decision.

If failing to acquire the user preference, the radio base station 100 may use statistical information described below to estimate a case where the offload process and/or re-offload process is performed in accordance with a user's decision. It is assumed that the radio base station 100 measures first throughput at an arbitrary time, for example. This first throughput corresponds to, for example an average throughput before the determination parameters are updated. This average throughput reflects a variation in the throughput which would be caused due to the performing of the re-offload process and the re-offload process according to a user's decision. Then, the radio base station 100 measures second throughput when the determination parameters are updated. This second throughput also reflects a variation in the throughput which would be caused due to the performing of the re-offload process and the re-offload process according to a user's decision. Thus, the difference between the first throughput and the second throughput can be regarded as a variation in the throughput which would be caused due to the update of the determination parameters. Moreover, the radio base station 100 can know a throughput ratio, or statistical information, that would be attributed to the update of the determination parameters by calculating the ratio of the first throughput (or the second throughput) to a variation in the throughput which would be caused due to the update of the determination parameters. In this way, the radio base station 100 can set or update more appropriately the determination parameters and the Tsteering WLAN Timer by reflecting the statistical information, if filing to acquire the user preference.

Figure 7:
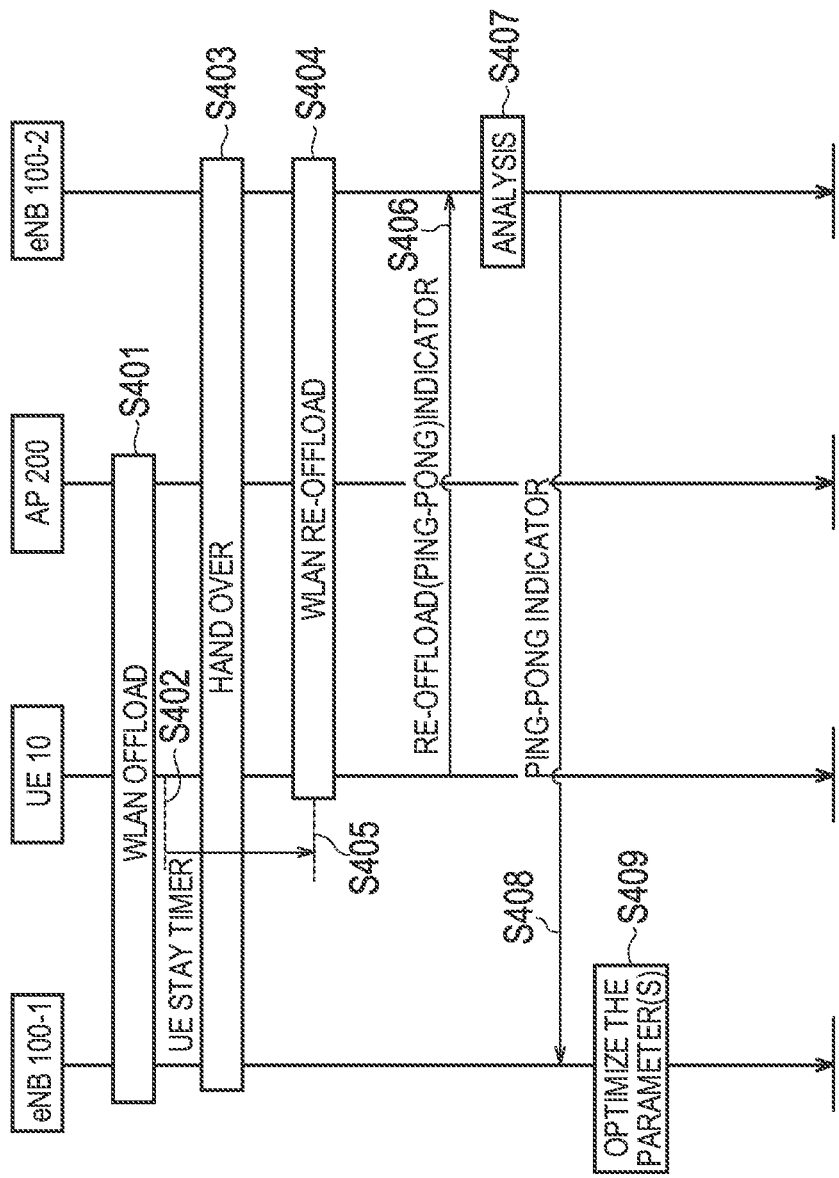
FIG. 7 is a sequence diagram for illustrating operation B-2 according to the embodiment.

Second, with reference to FIG. 7, a description will be given regarding a case where the radio terminal 10 performs an offload process from a radio base station 100-1 to the wireless LAN and in turn a re-offload process from the wireless LAN to a radio base station 100-2 that is independent of the radio base station 100-1. FIG. 7 is a sequence diagram for illustrating operation B-2 according to the embodiment.

As illustrated in FIG. 7, at Step S401, the radio terminal 10 performs the offload process from the radio base station 100-1 to the access point 200.

At Step S402, the radio terminal 10 starts to operate the UE stay timer by using the performing of the offload process as the trigger.

Steps S403 and S404 correspond to Steps S203 and S204, respectively.

At Step S405, the radio terminal 10 stops the operation of the UE stay timer by using the performing of the re-offload process as the trigger.

At Step S406, the radio terminal 10 transmits the re-offload indicator and/or the ping-pong indicator to the radio base station 100-2.

At Step S407, when receiving the re-offload indicator, the radio base station 100-2 determines whether the ping-pong phenomenon has occurred, on the basis of the WLAN stay time contained in the re-offload indicator. If the ping-pong phenomenon has occurred, the radio base station 100-2 transmits the ping-pong indicator to the radio base station 100-1, which is the previous source base station for the radio terminal 10. In this case, the ping-pong indicator may be any information indicating the occurrence of the ping-pong phenomenon.

On the other hand, if receiving the ping-pong indicator from the radio terminal 10, the radio base station 100-2 forwards this ping-pong indicator to the radio base station 100-1, which is the previous source base station for the radio terminal 10 (see S408). Alternatively, the radio base station 100-2 may generate a new ping-pong indicator and then transmit this ping-pong indicator to the radio base station 100-1.

Step S409 corresponds to Step S208.

(C) Access Point 200

Next, a description will be given regarding a case where the access point 200 has a UE stay timer.

Figure 8:
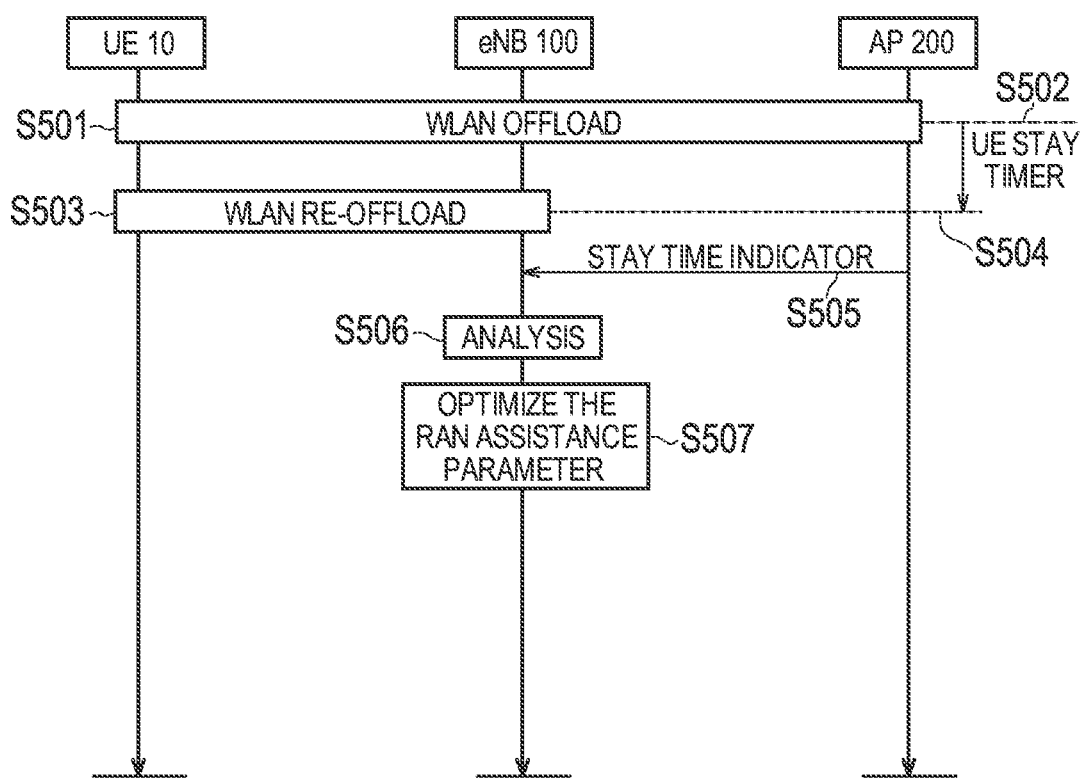
FIG. 8 is a sequence diagram for illustrating operation C-1 according to the embodiment.

First, with reference to FIG. 8, a description will be given regarding a case where the radio terminal 10 having performed the offload process from the radio base station 100 to the wireless LAN performs the re-offload process from the wireless LAN to the same radio base station 100. FIG. 8 is a sequence diagram for illustrating operation C-1 according to the embodiment.

Step S501 corresponds to Step S101.

At Step S502, the access point 200 starts to operate the UE stay timer by using the performing of the offload process as the trigger. When detecting the start or end of the offload process, for example, the access point 200 starts to operate the UE stay timer. Alternatively, when starting to connect to the radio terminal 10, the access point 200 starts to operate the UE stay timer.

Step S503 corresponds to Step S103.

At Step S504, the access point 200 stops the operation of the UE stay timer by using the performing of the re-offload process as the trigger. When detecting the start or end of the re-offload process, for example, the access point 200 stops the operation of the UE stay timer. Alternatively, when terminating the connection to the radio terminal 10, the access point 200 stops the operation of the UE stay timer.

At Step S505, the access point 200 transmits a stay time indicator to the radio base station 100, which is a message regarding the measurement result from the UE stay timer, or a measurement result of the stay time.

The access point 200 may transmit the stay time indicator whenever the radio terminal 10 performs the re-offload process. Alternatively, the access point 200 may transmit the stay time indicator when the stay time exceeds a threshold, such as that indicating an occurrence of the ping-pong phenomenon. Instead of or in addition to the stay time indicator, the access point 200 may transmit the re-offload indicator and/or the ping-pong indicator.

The stay time indicator may contain the pieces of information listed below.
Message Type
eNB identifier (E-UTRAN CGI [Source cell/Target cell])
WLAN identifier (WLAN ID)
UE identifier (UE ID)
WLAN stay time (WLANStayTimer)
offload traffic (OffloadTraffic)

The above message type indicates that the message is the stay time indicator. The UE identifier is any information with which the radio terminal 10 can be identified; examples of UE identifier include one or more of a contractor code, an IP address, and a TEID (Tunnel Endpoint IDentifier).

Steps S506 and S507 correspond to Step S105 and S106, respectively.

Figure 9:
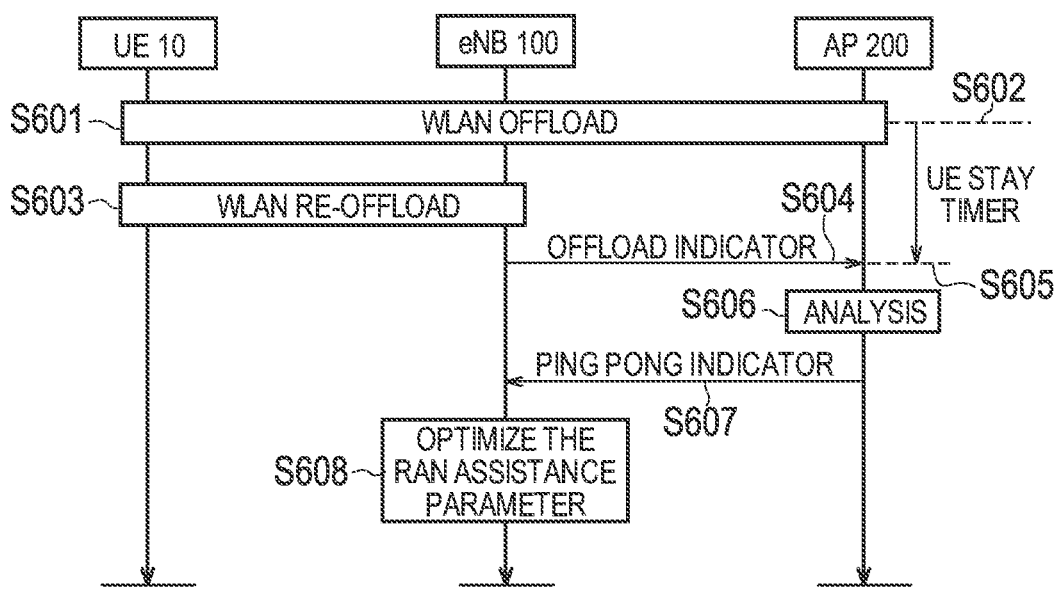
FIG. 9 is a sequence diagram for illustrating operation C-2 according to the embodiment.

Second, with reference to FIG. 9, a description will be given regarding a case where the radio terminal 10 having performed the offload process from the radio base station 100 to the wireless LAN performs the re-offload process from the wireless LAN to the same radio base station 100. FIG. 9 is a sequence diagram for illustrating operation C-2 according to the embodiment.

In the first operation described above, the access point 200 with the UE stay timer does not determine whether the ping-pong phenomenon has occurred. In the second operation that will be described below, the access point 200 determines whether the ping-pong phenomenon has occurred (see S606).

Steps S601 to S603 correspond to Step S501 to S503, respectively.

At Step S604, the radio base station 100 transmits the re-offload indicator to the access point 200, which indicates that the radio terminal 10 has performed the re-offload process from the wireless LAN to the radio base station 100.

At Step S605, the access point 200 stops the operation of the UE stay timer in response to the reception of the re-offload indicator from the radio base station 100.

At Step S606, the access point 200 determines whether the ping-pong phenomenon has occurred, in the same manner as the radio base station 100 does at Step S105.

At Step S607, if determining that the ping-pong phenomenon has occurred, the access point 200 transmits the ping-pong indicator to the radio base station 100. Alternatively, the access point 200 may transmit the stay time indicator to the radio base station 100 instead of the ping-pong indicator. In this case, the ping-pong indicator may contain the same information as in the stay time indicator described above. This ping-pong indicator may be any information indicating an occurrence of the ping-pong phenomenon.

Step S608 corresponds to Step S106.

Third, with reference to FIG. 10, a description will be given regarding a case where the radio terminal 10 having performed the offload process from a radio base station 100-1 to the wireless LAN performs the re-offload process from the wireless LAN to a radio base station 100-2 that is independent of the radio base station 100-1. FIG. 10 is a sequence diagram for illustrating operation C-3 according to the embodiment.

Steps S701, S703, and S704 correspond to Steps S201, S203, and S204, respectively. Step S702 corresponds to Step S502.

At Step S705, the radio base station 100-2 transmits the re-offload indicator to the access point 200, which indicates that the radio terminal 10 has performed the re-offload process from the wireless LAN to the radio base station 100.

At Step S706, the access point 200 stops the operation of the UE stay timer in response to the reception of the re-offload indicator from the radio base station 100-2.

Step S707 corresponds to Step S606.

At Step S708, if determining that the ping-pong phenomenon has occurred, the access point 200 transmits the ping-pong indicator to the radio base station 100-1, which is the previous source base station for the radio terminal 10. Alternatively, the access point 200 may transmit the stay time indicator to the radio base station 100-1 instead of the ping-pong indicator. In this case, the ping-pong indicator may be any information indicating an occurrence of the ping-pong phenomenon.

Step S709 corresponds to Step S208.

(Conclusion)

A radio base station 100 in this embodiment measures the stay time for a wireless LAN. More specifically, the radio base station 100 comprises a controller configured to have a UE stay timer. The radio base station 100 can thereby know a stay time for which a radio terminal 10 stays on the wireless LAN, and then can know whether the ping-pong phenomenon has occurred. This determination result causes the radio base station 100 to set determination parameters appropriately.

A radio terminal 10 in this embodiment measures a stay time for which the radio terminal 10 itself stays on a wireless LAN. More specifically, the radio terminal 10 comprises: a controller configured to have a UE stay timer; and a transmitter configured to transmit a message based on the measurement result from the UE stay timer, such as a re-offload indicator or a ping-pong indicator. In addition, an access point 200 measures the stay time for the wireless LAN. More specifically, the access point 200 comprises a controller configured to have a UE stay timer; and a transmitter configured to transmit a message based on the measurement result from the UE stay timer, such as a stay time indicator or a ping-pong indicator. The controller may be implemented using a processor, and the transmitter may be implemented using a network interface or a radio transceiver. A radio base station 100 comprises a receiver configured to receive the messages indicating the measurement result from the UE stay timer. The radio base station 100 can know whether the ping-pong phenomenon has occurred by receiving the messages. The determination result causes the radio base station 100 to set determination parameters appropriately.

If a radio base station 100 in this embodiment detects that a phenomenon satisfying a predetermined condition, or the ping-pong phenomenon, has occurred and that the radio terminal 10 switches its waiting destination or its connection destination from a mobile communication network to a wireless LAN and then from the wireless LAN to the mobile communication network, the radio base station 100 determines a parameter to which the radio terminal 10 refers when determining whether to switch the waiting destination or the connection destination from the mobile communication network to the wireless LAN. More specifically, if the radio base station 100 detects that the ping-pong phenomenon has occurred and that the radio terminal 10 switches the waiting destination or the connection destination to the wireless LAN and then to the mobile communication network, the radio base station 100 determines the determination parameter to which the radio terminal 10 refers in order to determine whether to switch the waiting destination or the connection destination from the mobile communication network to the wireless LAN and/or whether to switch the waiting destination or the connection destination from the wireless LAN to the mobile communication network. This causes the radio base station 100 to set the determination parameters appropriately so that no more ping-pong phenomenon will occur.

OTHER EMBODIMENTS

The contents of the present application have been described. However, it should be understood that the foregoing description and drawings which constitute a part of the present disclosure are not intended to limit the contents of the present application. Those skilled in the art could conceive of various alternative embodiments, examples, and practical techniques in light of the disclosure.

If a cell is selected or reselected in the forgoing embodiment instead of the handover procedure, the foregoing operation may also be done. In other words, the offload process may be performed when a radio terminal 10 is in an idle state.

A radio base station 100 in the foregoing embodiment may transmit setting information (Configuration) regarding a UE stay timer to a radio terminal 10 through a SIB or a dedicated signaling. The radio base station 100 may transmit the above setting information to the radio terminal 10 if an RRC connection has been established or is to be established. The radio terminal 10 can thereby start up a UE stay timer in accordance with the setting information.

The setting information may contain information that designates which piece of information is to be contained in a re-offload indicator or a ping-pong indicator. The radio terminal 10 determines which piece of information is to be contained in the re-offload indicator or the ping-pong indicator, on the basis of the setting information. In addition, the setting information may designate timing at which information not to be contained in the re-offload indicator or the ping-pong indicator is transmitted separately.

For example a radio terminal 10 may transmit a UE measurement report and/or an offload cause to a radio base station 100 separately from a re-offload indicator or a ping-pong indicator. For example the radio terminal 10 may transmit the UE measurement report and the like when an RRC connection to the radio base station 100 is established (e.g., when a re-offload process is performed). Alternatively, the radio terminal 10 may transmit the UE measurement report and the like in accordance with a request from the radio base station 100. If the re-offload indicator or the ping-pong indicator received from the radio terminal 10 or an access point 200 does not contain desired information, such as the UE measurement report, the radio base station 100 may transmit a request for this information to the radio terminal 10. In this case, the radio base station 100 may transmit this request through a terminal information procedure (UE Information Procedure).

In this way, when failing to receive both a re-offload indicator and a ping-pong indicator from the radio terminal 10, the radio base station 100 can optimize determination parameters by receiving the UE measurement report and/or the offload cause from the radio terminal 10.

The radio terminal 10 may transmit a UE measurement report to a radio base station 100 together with a measurement of an MDT (Minimization of Drive Test). The radio terminal 10 that has been set or is configured to perform the MDT measures the state of a received signal and reports, to a mobile communication network (radio base station 100), measurement data that contains information regarding the measurement result and the location of the measurement. An MDT to be performed while a radio terminal is in the course of communication is referred to as an immediate MDT; an MDT to be performed while a radio terminal is in a waiting state is referred to as a logged MDT. The radio terminal 10 may transmit the UE measurement report to the radio base station 100 together with the report of the immediate or logged MDT.

A radio base station 100 may transmit setting information (Configuration) to a radio terminal 10 through a SIB or a dedicated signaling; the setting information indicates a measurement of the quality and/or strength of a signal received via a wireless LAN, and this measurement is acquired while the radio terminal 10 stays on the wireless LAN. Setting information contains such as information designating a method of reporting a measurement, a measuring period, a frequency to be targeted for measuring, and an area covering a measuring target, such as a tracking area.

A radio base station 100 may determine which access point 200 is to be subjected to an offload process, on the basis of a UE measurement report. Assuming that a signal received via a certain access point 200 within a predetermined area has a low strength, this access point 200 may be eliminated from objects to be subjected to the offload process within this area.

Although not described particularly in the embodiment, a program that causes a computer to perform processes of the radio terminal 10 or the radio base station 100 may be provided. This program may be stored in a computer readable medium. Using this computer readable medium enables the program to be installed in a computer. The computer readable medium that stores the program may be a nonvolatile recording medium, examples of which include, but are not limited to, a CD-ROM and a DVD-ROM.

A chip including: a memory that stores a program for performing processes of the radio terminal 10 or the radio base station 100; and a processor that executes the program stored in the memory may be provided.

Although an exemplary mobile communication network conforms to the LTE in the embodiment, there is no limitation on the specification of a mobile communication network. The mobile communication network may be any network given by a carrier, which conforms to a UMTS (Universal Mobile Telecommunications System) and GSM, for example.

ADDITIONAL REMARK

It will be described below about items of the additional remarks of the present embodiment below.

(1) Introduction

In the additional remarks, we discuss the necessary of the MRO (Mobility Robustness Optimization) involving WLAN to optimize the RAN assistance parameters.

(2) Discussion (2.1) Needs for Further Use Cases of Coordination Involving WLAN

The RAN assistance parameters (determination parameters) are used in the UE for the decision of traffic steering between E-UTRAN and WLAN. The RAN assistance parameters are configured by the eNB. Although the same mechanism was introduced for UTRAN, the following consideration assumes the RAN assistance parameter for E-UTRAN in order to simplify the discussion.

Table 1 shows a summary of the RAN assistance parameters with some categorizations and possible solutions for the eNB to configure the parameters with appropriate values. Note that the OAM to provide (at least initial) the parameter is baseline but it is omitted in Table 1.

To optimize UE throughput and cell load, RSRP and RSRQ thresholds are used. It is assumed that these thresholds were determined based on load status in the eNB itself.

Observation 1: RSRP and RSRQ thresholds may be determined by the condition of the eNB itself.

The other thresholds are available for BSS load, WAN metrics and Beacon RSSI, which are used to evaluate throughput and/or load status in WLAN. These thresholds are used for very similar purpose to RSRP and RSRQ thresholds, i.e. for optimization of UE throughput before/after the traffic steering. Therefore, the developing solutions for the estimation of UE throughput in WLAN may be re-used for the determination of the thresholds.

Observation 2: BSS load, WAN metrics and Beacon RSSI thresholds can be possibly determined by the developing solutions for the estimation of UE throughput in WLAN.

Observation 3: RAN assistance parameters for throughput and load optimization may be automatically determined by means of the existing information or developing solutions.

As for mobility optimization purpose, the RAN assistance parameter has $Tsteering_{WLAN}$, which is similar timer to the existing Time To Trigger (TTT) for E-UTRAN measurements and is common view to use it for mobility purpose. If during $Tsteering_{WLAN}$, which is adjustable between 0 and 7, the evaluation fulfills the criteria based on the thresholds for RSRP, RSRQ, BSS load, WAN metrics and Beacon RSSI, the UE decide to inform higher layer of the traffic steering opportunity, which is a bare bones in the Rel-12 mechanism, meanwhile it discussed that it should be noted that timer value should be long enough in order that frequent changes of access network could be avoided. Obviously, the most suitable threshold to be configured to $Tsteering_{WLAN}$ is different under different deployments. Therefore, it should be optimized depending on the practical deployments. However, current use case in MRJC cannot determine the threshold because it just estimates the UE throughput in WLAN, so at this point the threshold has no other choice to be configured with a fixed value provided by OAM. Considering a large amount of WLAN APs are being deployed day by day, the problem is how to maintain the optimal thresholds following the changes in WLAN radio conditions. Therefore, the problem should be solved by an autonomous mechanism to update the thresholds, i.e. MRO involving WLAN.

Proposal 1: It should agree to capture the mobility robustness optimization involving WLAN as a new use case.

With regard to WLAN identifiers, i.e. BSSID, ESSID and HESSID of the AP, some companies also have interested in automatic collection mechanisms, e.g. ANR involving WLAN.

TABLE 1

| Main focus | RAN assistance parameters | | Possible solutions |
|---|---|---|---|
| Throughput and load | RSRP | To WLAN; $Thresh_{ServingOffloadWLAN, LowP}$ From WLAN; $Thresh_{ServingOffloadWLAN, HighP}$ | Load information in eNB itself may determine the parameters. |
| | RSRQ | To WLAN; $Thresh_{ServingOffloadWLAN, LowQ}$ From WLAN; $Thresh_{ServingOffloadWLAN, HighQ}$ | |
| | BSS load (Channel utilization) | To WLAN; $Thresh_{ChUtilWLAN, Low}$ From WLAN; $Thresh_{ChUtilWLAN, High}$ | Information obtained for estimation of throughput in WLAN may be re-used. |
| | WAN metrics (Backhaul rate) | To WLAN; $Thresh_{BackhRateDLWLAN, High}$ $Thresh_{BackhRateULWLAN, High}$ From WLAN; $Thresh_{BackhRateDLWLAN, Low}$ $Thresh_{BackhRateULWLAN, Low}$ | |
| | Beacon RSSI | To WLAN; $Thresh_{BeaconRSSIWLAN, High}$ From WLAN; $Thresh_{BeaconRSSIWLAN, Low}$ | |
| Mobility | Time interval for decision | $Tsteering_{WLAN}$ | None so far. (May need MRO-like mechanism.) |
| General | SSID, BSSID, HESSID | WLAN identifiers | None so far. (May need ANR-like mechanism) |

Table 1 is a table for explanation of RAN assistance parameters. Please note that the OAM to provide (at least initial) the parameter is baseline but it is omitted in Table 1.

(2.2) Mobility Robustness Optimization Involving WLAN

The UE may suffer from QoE degradation due to ping-pong traffic steering between 3GPP and WLAN, which is caused by its mobility. Additionally, UE mobility may also cause inaccurate traffic steering which results in throughput degradation. Currently, there is no information in RAN to avoid such degradation. It is beneficial to investigate which information (if any) is helpful to be exchanged between 3GPP and WLAN and to extend (if any) the Mobility Robustness Optimization mechanism in consideration of WLAN deployments.

Issue 1: How to avoid the ping-pong traffic steering

Issue 2: How to avoid too early traffic steering and/or too late traffic steering (2.3) RAN assistance parameter adjustment for mobility robustness As mentioned in section 2.1, $Tsteering_{WLAN}$ is essential to optimize the motility robustness. Obviously, if taking only the offloading efficiency into account then $Tsteering_{WLAN}$ should be configured with the minimum value (0 [s]), but it may cause mobility problems such as ping-pong steering. Therefore, in order to provide the better user experience, $Tsteering_{WLAN}$ needs to be configured with a balanced value between offloading efficiency and ping-pong avoidance.

Another aspect to be considered for UE mobility is the variance of radio conditions, as well-known. Normally the thresholds for radio condition evaluation have a hysteresis between in- and out-of-conditions, and RAN assistance parameters also have two thresholds for such purpose. For example, the hysteresis of RSRP thresholds can be denoted as ($Thresh_{ServingOffloadWLAN,HighP}$ − $Thresh_{ServingOffloadWLAN,LowP}$) [dB]. Needless to say, the hysteresis configured with radio condition-related RAN assistance parameters will affect the network performances along with UE mobility.

Proposal 2: If the proposal 1 is acceptable, it should agree MRO involving WLAN takes into account the optimization of $Tsteering_{WLAN}$ and/or hysteresis of the thresholds for RSRP, RSRQ and Beacon RSSI.

(2.4) Possible Information for MRO Involving WLAN

The existing MRO for E-UTRAN has RLF INDICATION and HANDOVER REPORT, which can be used to detect Too Early HO, Too Late HO and HO to Wrong Cell. In consideration for MRO involving WLAN, a different point from the existing MRO is no relation to RLF, i.e. RLF does not depends on whether the traffic steering failure to/from WLAN.

However, Too Early Steering from E-UTAN to WLAN and Too Late Steering from WLAN to E-UTRAN may be a problem for similar reason, i.e. if the UE does not decide the traffic steering even though the UE is no longer provided sufficient throughput by a radio access network (E-UTRAN or WLAN), the QoE of the UE may be severely impacted. Therefore, it should consider solutions to avoid such wrong traffic steering. It should be considered as a possible solution to monitor UE throughput in WLAN after traffic steering.

Proposal 3: It should consider how to detect throughput degradation before/after traffic steering.

The other aspect to be considered is ping-pong avoidance. For example, if the RAN assistance parameters for traffic steering to WLAN and those for traffic steering from WLAN are not aligned well, i.e. wrong hysteresis is configured, the UE may decide to steer traffic back to WLAN immediately after traffic steering to E-UTRAN. Such ping-pong steering between E-UTRAN and WLAN may result in more degradations in user experiences than that between E-UTRAN cells, because the traffic steering has much latency than HO. Therefore, RAN3 should consider how to detect ping-pong steering.

Proposal 4: It should consider how to detect ping-pong steering between E-UTRAN and WLAN.

(3) Conclusion

In the additional remarks, we discuss the necessary of the MRO involving WLAN to optimize the RAN assistance parameters.

In addition, the entire content of U.S. Provisional Application No. 62/056,061 (filed on Sep. 26, 2014) is incorporated in the present specification by reference.

The invention claimed is:

1. A first base station included in a mobile communication network, comprising:
 a controller configured to measure a stay period for which a radio terminal has stayed on a wireless Local Area Network (LAN), wherein
 the stay period is a period from when an offload process through which the radio terminal switches a waiting destination or a connection destination from the mobile communication network to the wireless LAN is performed to when a re-offload process through which the radio terminal switches the waiting destination or the connection destination from the wireless LAN to the mobile communication network is performed,
 the controller is configured to determine that a ping-pong phenomenon has occurred when the measured stay period is less than a threshold,
 the controller is further configured to determine whether the occurrence of the ping-pong phenomenon is attributed to a handover procedure, based on whether a re-offload indicator is received from a second base station included in the mobile communication network, the re-offload indicator indicating that the radio terminal has performed the re-offload process in which the waiting destination or the connection destination is switched from the wireless LAN to the second base station,
 the controller is further configured to change a handover parameter in response to a determination that the occurrence of the ping-pong phenomenon is attributed to the handover procedure, wherein
 the handover parameter is used by the radio terminal to determine whether to perform the handover procedure, and
 the controller is further configured to change the handover parameter so that the handover procedure starts before the offload process.

2. The first base station according to claim 1, wherein
 the controller detects that the radio terminal has performed the re-offload process by receiving the re-offload indicator from the second base station.

3. The first base station according to claim 1, wherein
 the controller is configured to determine a parameter on a basis of the stay period, and
 the parameter is used by the radio terminal to determine whether to switch the waiting destination or the connection destination from the mobile communication network to the wireless LAN.

4. A communication method comprising:
 measuring a stay period for which a radio terminal has stayed on a wireless Local Area Network (LAN), by a first base station included in a mobile communication network, the stay period being a period from when an offload process through which the radio terminal switches a waiting destination or a connection destination from the mobile communication network to the wireless LAN is performed to when a re-offload process through which the radio terminal switches the waiting destination or the connection destination from the wireless LAN to the mobile communication network is performed,
 determining, by the first base station, that a ping-pong phenomenon has occurred when the measured stay period is less than a threshold;
 determining, by the first base station, whether the occurrence of the ping-pong phenomenon is attributed to a handover procedure, based on whether the first base station receives a re-offload indicator from a second base station included in the mobile communication network, the re-offload indicator indicating that the radio terminal has performed the re-offload process in which the waiting destination or the connection destination is switched from the wireless LAN to the second base station; and
 changing, by the first base station, a handover parameter in response to the determination that the occurrence of the ping-pong phenomenon is attributed to the handover procedure, wherein
 the handover parameter is used by the radio terminal to determine whether to perform the handover procedure, and
 the first base station changes the handover parameter so that the handover procedure starts before the offload process.

* * * * *